US009858173B2

(12) United States Patent
Thiruvillamalai et al.

(10) Patent No.: US 9,858,173 B2
(45) Date of Patent: Jan. 2, 2018

(54) RECORDING USER-DRIVEN EVENTS WITHIN A COMPUTING SYSTEM INCLUDING VICINITY SEARCHING

(75) Inventors: Varadarajan (TSV) Thiruvillamalai, Hyderabad (IN); Deepraj Sitaram Dixit, Hyderabad (IN); Rajeev Kumar, Hyderabad (IN); Thej Kumar Siddhotman Arulraj, Hyderabad (IN); Singireddy Neeraja Reddy, Hyderabad (IN); Mathew Kuzhithattil Aniyan, Hyderabad (IN); Abhinav Anand, Bihar (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 1178 days.

(21) Appl. No.: 13/308,888

(22) Filed: Dec. 1, 2011

(65) Prior Publication Data
US 2013/0145294 A1 Jun. 6, 2013

(51) Int. Cl.
*G06F 11/36* (2006.01)
*G06F 3/048* (2013.01)
*G06F 3/0484* (2013.01)
*G06F 9/44* (2006.01)

(52) U.S. Cl.
CPC .......... *G06F 11/3672* (2013.01); *G06F 3/048* (2013.01); *G06F 3/04842* (2013.01); *G06F 8/38* (2013.01); *G06F 11/3664* (2013.01); *G06F 11/3696* (2013.01)

(58) Field of Classification Search
CPC .. G06F 3/048; G06F 11/3672; G06F 11/3692; G06F 11/3696; G06F 3/04842; G06F 8/38; G06F 11/3664
See application file for complete search history.

(56) References Cited

U.S. PATENT DOCUMENTS

| 5,600,789 A * | 2/1997 | Parker ................. G06F 11/3688 714/38.11 |
| 5,781,720 A * | 7/1998 | Parker ................. G06F 11/3688 714/38.11 |
| 6,968,509 B1 * | 11/2005 | Chang ................. G06F 9/45512 714/E11.207 |

(Continued)

OTHER PUBLICATIONS

Joselli, et al., "gRmobile: A Framework for Touch and Accelerometer Gesture Recognition for Mobile Games", Retrieved at <<http://ieeexplore.ieee.org/stamp/stamp.jsp?tp=&arnumber=5479100>>, VIII Brazilian Symposium on Games and Digital Entertainment (SBGAMES), Oct. 8-10, 2009, pp. 141-150.

(Continued)

*Primary Examiner* — Shen Shiau
(74) *Attorney, Agent, or Firm* — Dicke, Billig & Czaja, PLLC

(57) ABSTRACT

A method of recording user-driven events within a computing system includes receiving an indication that a user interacted with a first graphical user interface (GUI) user interactive control. The method includes automatically searching at least one vicinity near the first GUI user interactive control for descriptive information associated with the first GUI user interactive control, and automatically recording a user-driven event that represents the user interaction with the first GUI user interactive control and includes the descriptive information.

20 Claims, 6 Drawing Sheets

(56) References Cited

U.S. PATENT DOCUMENTS

| | | |
|---|---|---|
| 7,770,136 B2 | 8/2010 | Beeck et al. |
| 7,917,755 B1 | 3/2011 | Giliyaru et al. |
| 8,826,185 B2 * | 9/2014 | Ikegami ............... G06F 8/38 715/853 |
| 2001/0035860 A1 | 11/2001 | Segal et al. |
| 2003/0125956 A1 | 7/2003 | Lewis et al. |
| 2006/0031786 A1 | 2/2006 | Hillis et al. |
| 2006/0101392 A1 * | 5/2006 | Isaza ............... G06F 8/38 717/108 |
| 2006/0187196 A1 | 8/2006 | Underkoffler et al. |
| 2008/0155515 A1 | 6/2008 | Stewart |
| 2008/0165141 A1 | 7/2008 | Christie |
| 2009/0094614 A1 | 4/2009 | Klementiev et al. |
| 2009/0182753 A1 | 7/2009 | Chang et al. |
| 2009/0249300 A1 | 10/2009 | Vainer et al. |
| 2009/0273597 A1 * | 11/2009 | Chatamballi et al. ........ 345/418 |
| 2010/0123724 A1 | 5/2010 | Moore et al. |
| 2010/0146420 A1 | 6/2010 | Bharadwaj et al. |
| 2011/0004868 A1 | 1/2011 | Bharadwaj |
| 2011/0111798 A1 | 5/2011 | Jeon et al. |
| 2011/0179365 A1 * | 7/2011 | Ikegami ............... G06F 8/38 715/764 |

OTHER PUBLICATIONS

"How to: Record User Interface Actions for Manual Tests Using Test Settings", Retrieved at <<http://msdn.microsoft.com/en-us/library/dd286736.aspx>>, Retrieved Date: Jul. 14, 2011, pp. 3.

"Accessibility QA Test Case: Object inspection Testing", Retrieved at <<http://www.mozilla.org/access/qa/win-ui-object-inspection.html>>, Retrieved Date: Jul. 14, 2011, pp. 4.

\* cited by examiner

RECORDING USER-DRIVEN EVENTS WITHIN A COMPUTING SYSTEM INCLUDING VICINITY SEARCHING

BACKGROUND

The process of correcting the bugs in a computer program is referred to as "debugging." The efficiency of the debugging process is greatly improved if each bug can be reproduced. Reproducing a bug generated in response to user-driven events requires that the user know the exact sequence of events that were performed that caused the bug to occur. Sometimes a bug results from the culmination of many events happening in a particular sequence that can be nearly impossible for a user to remember. The steps for reproducing a bug are often referred to as the "repro steps."

To complicate the debugging process even further, the person experiencing the bug may not be the same individual who will attempt to debug the program. Therefore, the person experiencing the bug conveys the sequence of events to the person who will debug the application. Conveying the sequence of events requires not only that the person experiencing the bug recall each of the events, but also that each event be conveyed accurately. If the person forgets a particular user-driven event or forgets the order of events, then the user-driven events will not be adequately reproducible. As a result, the bug may not be corrected.

Previous software solutions exist that are capable of recording user-driven events within an application program. These previous solutions suffer from a number of significant limitations, however, that impact their usefulness.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Previous software solutions exist that are capable of recording user-driven events within an application program, but these solutions suffer from a number of significant limitations, however, that impact their usefulness. For example, while developing an application, not all graphical user interface (GUI) interactive controls are given readable and easily identifiable properties. In these scenarios with nameless interactive controls, action recording cannot give meaningful action logs. One embodiment is directed to a method that automatically finds a label (or contents in an image) near an interactive control using preferred UI guidelines, and uses this information to provide a rich action log.

One embodiment is directed to a method of recording user-driven events within a computing system. The method includes receiving an indication that a user interacted with a first GUI user interactive control. The method includes automatically searching at least one vicinity near the first GUI user interactive control for descriptive information associated with the first GUI user interactive control, and automatically recording a user-driven event that represents the user interaction with the first GUI user interactive control and includes the descriptive information.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated, as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that features of the various exemplary embodiments described herein may be combined with each other, unless specifically noted otherwise.

In a computing environment, applications that use graphical user interfaces (GUIs) to allow computer users to interact with the application can comprise many and varied user interactive controls. When applications that comprise GUIs are being developed, testers will typically test the GUI controls to determine whether they operate within prescribed parameters (e.g., do not throw errors in the application). Because GUI controls can often react differently to different events (e.g., click, mouse hover, enter data, select item), and may allow for different types of data, having different properties, testing all of a GUI's controls can be cumbersome. Testing GUIs can be difficult, as current testing approaches typically utilize ad-hoc manual testing. Manual testing can be cumbersome and time consuming for a tester.

Figure 1:
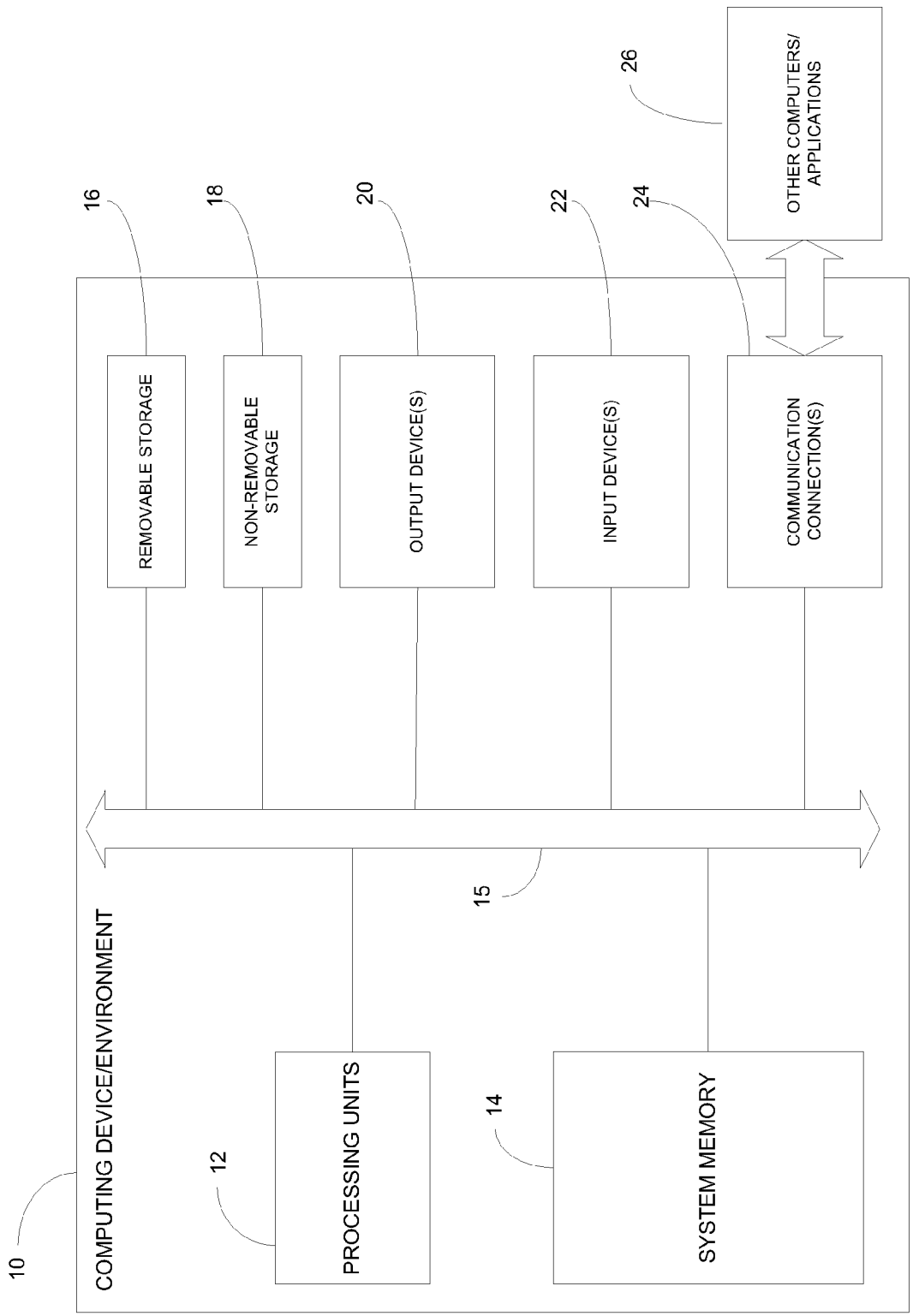
FIG. 1 is a block diagram illustrating a computing environment suitable for implementing aspects of a system for recording user-driven events according to one embodiment.

FIG. 1 is a diagram illustrating a computing environment 10 suitable for implementing aspects of a system for automatically recording user-driven events according to one embodiment. In the illustrated embodiment, the computing system or computing device 10 includes one or more processing units 12 and system memory 14. Depending on the exact configuration and type of computing device, memory 14 may be volatile (such as RAM), non-volatile (such as ROM, flash memory, etc.), or some combination of the two.

Computing device 10 may also have additional or different features/functionality and additional or different hardware and software. For example, computing device 10 may also include additional storage (removable and/or non-removable) including magnetic or optical disks or tape. Such additional storage is illustrated in FIG. 1 by removable storage 16 and non-removable storage 18. Computer storage media includes volatile and nonvolatile, removable and non-removable media implemented in any suitable method or technology for storage of information such as computer readable instructions, data structures, program modules or other data. Memory 14, removable storage 16 and non-removable storage 18 are all examples of computer storage media (e.g., computer-readable storage media storing computer-executable instructions that when executed by at least one processor cause the at least one processor to perform a method). Computer storage media includes RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium that can be used to store the desired information and that can be accessed by computing device 10, and does not include transitory storage media. Any such non-transitory computer storage media may be part of computing device 10.

The various elements of computing device 10 are communicatively coupled together via one or more communication links 15. Computing device 10 also includes one or more communication connections 24, such as network connections, that allow computing device 10 to communicate with other computers/applications 26. Computing device 10 may also include input device(s) 22, such as keyboard, pointing device (e.g., mouse), pen, voice input device, touch input device, etc. Computing device 10 may also include output device(s) 20, such as a display, speakers, printer, etc.

FIG. 1 and the above discussion are intended to provide a brief general description of a suitable computing environment in which one or more embodiments may be implemented. It should be understood, however, that handheld, portable, and other computing devices of all kinds are contemplated for use. FIG. 1 thus illustrates an example of a suitable computing system environment 10 in which the embodiments may be implemented, although as made clear above, the computing system environment 10 is only one example of a suitable computing environment and is not intended to suggest any limitation as to the scope of use or functionality of the embodiments. Neither should the computing environment 10 be interpreted as having any dependency or requirement relating to any one or combination of components illustrated in the exemplary operating environment 10.

Computing device 10 according to one embodiment is configured to test an application while the application is being used by a user. In operation according to one embodiment, the user (e.g., a manual tester) interacts with the application using a graphical user interface. Actions performed by the user on the application are recorded by computing device 10, and the recorded information is used to create action logs. The action logs are used for creating rich bugs with reproduction (repro) steps.

Figure 2:
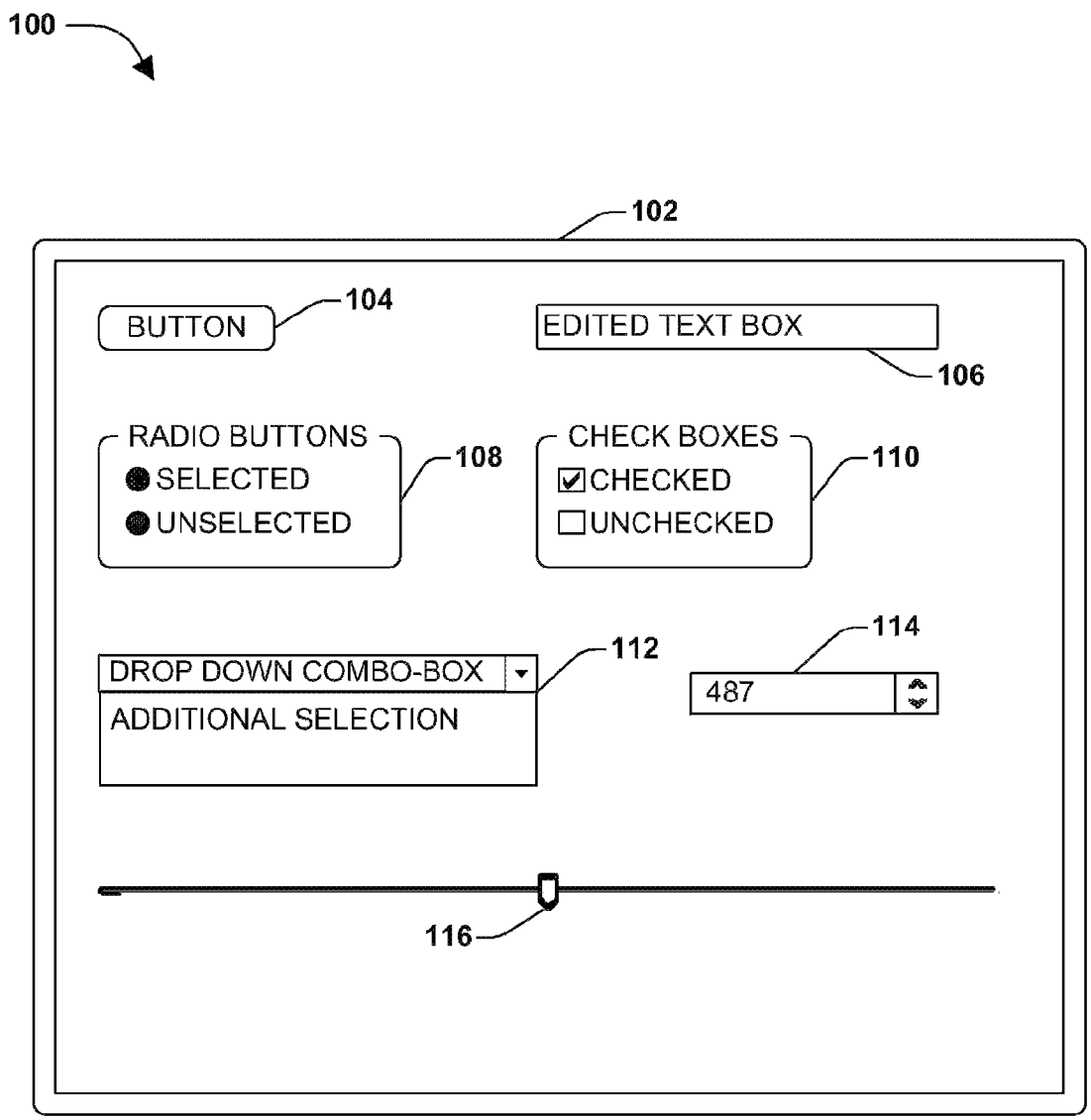
FIG. 2 is a diagram illustrating a graphical user interface (GUI) with user interactive controls.

FIG. 2 is a diagram illustrating a graphical user interface (GUI) 100 with user interactive controls. A GUI in an application under test (AUT) can comprise many GUI user interactive controls or "widgets," which may be exposed using an accessibility framework provided with the application for automated testing. The exemplary GUI 100 is displayed on a computer screen 102, and a user can move a mouse curser around the screen to select an interactive control with which to interact. A tester may also test the interactive controls to determine if the application reacts appropriately.

A common example of a GUI interactive control is a command button 104, which a user can click on to perform some function. The user can also enter data (e.g., strings, numbers, etc.) into an edited text box 106. Radio buttons 108 and check boxes 110 can be selected or unselected by a user, for example, to indicate a particular selected item. A number edit box 114 may be used to enter numbers, and to increase or decrease a number value by clicking on one of the attached "spin buttons" (arrows). A drop-down combo box 112 may include a list of items, from which the user can select, by clicking on an attached down-arrow. A scrollbar 116 can be used to scroll through portions of a page or video. Further, many more GUI interactive controls, and combinations of such, are available to program developers for use in GUIs (e.g., clickable buttons, text areas, text fields, scroll bars, sliders, list boxes, drop-down menus, radio buttons, check boxes, hypertext links, toolbars, ribbons, tree-views, tabs, tooltips, infobars, clickable images, and utility windows).

GUI interactive controls may be distinguished from static content elements by permitting a user or other actor such as, for example, another software program, to click on, type into, move, select, or otherwise manipulate or interact with the control. A GUI interactive control according to one embodiment includes any graphical user interface element sensitive to or otherwise susceptible to any direct or indirect manipulation, modification, indication or reception or other action as carried out with respect to that element via an actual or simulated user action.

In one embodiment, program status information of the application under test before and after user actions is automatically recorded by computing device 10, including the status of a set of GUI interactive controls of a user interface of the application. The recording may include an automated noting, storing, or recording of an indication of an event or events by which an actuation of an interactive control may be determined, inferred, computed, or derived. For example, an actuation comprising a selection of a particular item of a scrolling list may include the noting and storing of the position of a cursor when a mouse button is clicked, the timestamp at which this occurs, and an indication of the item selected and the scrolling list element specification upon which the scrolling list rendering is based. By analyzing the timing of various discrete actions as recorded by the computing device 10 with respect to the various elements displayed, discrete actions may be time-wise grouped or clustered into actuations with respect to various interactive controls for the purposes of user action recording. For example, in some embodiments, such clustering of discrete actions may be carried out by comparison of time stamps associated with each action.

While developing an application, not all GUI interactive controls are given readable and easily identifiable properties. Many existing applications have GUI interactive controls that do not have proper accessible names, or the names of the controls are not useful for repro steps (e.g., for a form-filling scenario). In these scenarios with nameless interactive controls, action recording cannot give meaningful action logs. The action log of the user action does not provide a clear intent of the user when the action is performed on nameless controls.

One embodiment is directed to a method that automatically finds a label (or contents in an image) near an interactive control using preferred UI guidelines, and uses this information to provide a rich action log. Using the nearby labels for giving a richer action log for finding bugs is very helpful to users. This enables users to easily identify the interactive control on which the user had acted upon instead of understanding how the control was implemented (e.g., its accessible name, etc). Using information in the vicinity of the nameless control in the action log makes the action log more verbose and more clearly identifies the user's intention. One embodiment finds a first interactive control which has useful information (e.g., text) that describes the usage of a second, nameless interactive control. Software developers typically follow certain GUI guidelines when developing software applications. One embodiment uses these guidelines in finding a label near a GUI interactive control.

Figure 3:
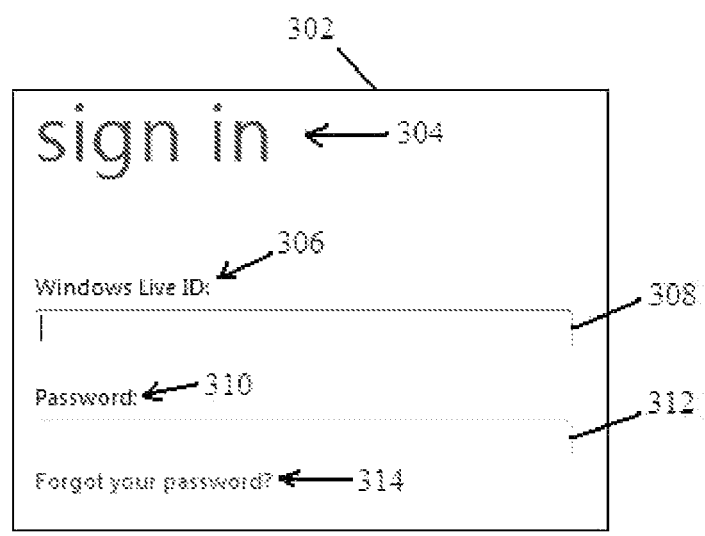
FIG. 3 is a diagram illustrating user interactive controls with descriptive information in the vicinity of the controls.

FIG. 3 is a diagram illustrating user interactive controls with descriptive information in the vicinity of the controls. A first interactive control 302 has associated "sign in" text 304. A second interactive control (i.e., a text box) 308 has associated "Windows Live ID:" text 306. A third interactive control 312 (i.e., a text box) has associated "Password:" text 310. A fourth interactive control 314 has associated "Forgot your password?" text. If a user enters "John@hotmail.com", for example, in the text box 308, and a recording tool is recording this action, then the action log according to one embodiment would look something like the following: "Type 'John@hotmail.com in 'Windows Live ID' text box". The "Windows Live ID" text in the action log is taken from the label 306 above the text box 308. This happens because the recording tool takes into account labels in the vicinity of the text box 308 to find a description of the text box 308. Without having considered information in the vicinity of an interactive control, the recording tool may generate an action log that depends only on the accessibility properties of the interactive control, which in typical scenarios is empty.

Figure 4:
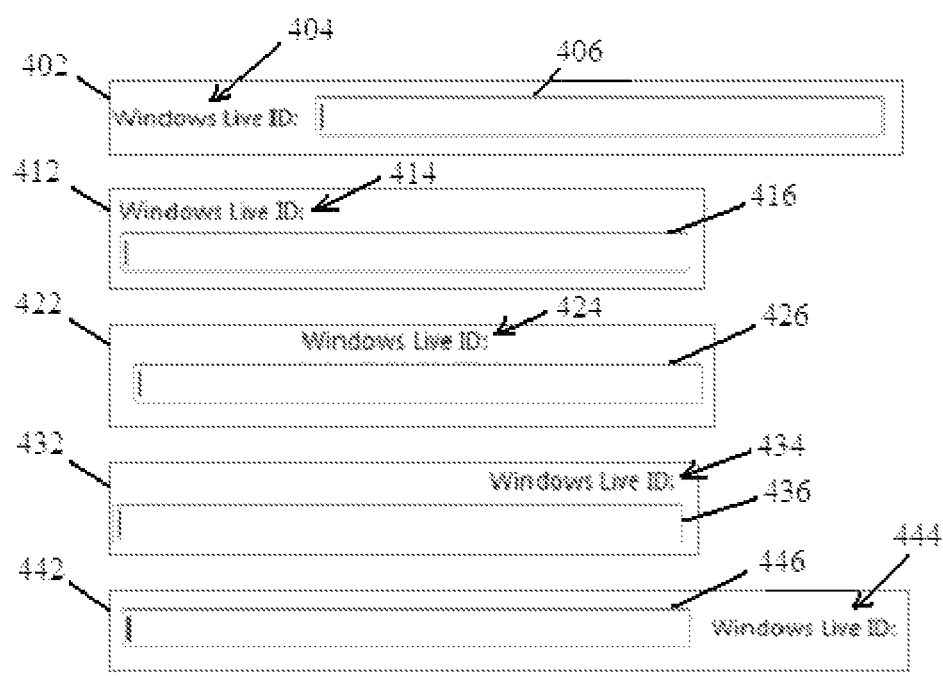
FIG. 4 is a diagram illustrating interactive controls with a label positioned at different locations around the interactive controls.

Labels or other descriptive information that can provide useful identifying information for nameless interactive controls can lie all around the nameless controls. FIG. 4 is a diagram illustrating interactive controls with a label positioned at different locations around the interactive controls. Interactive control 402 includes a label 404 positioned on the left side of text box 406. Interactive control 412 includes a label 414 positioned above and adjacent to a left end of text box 416. Interactive control 422 includes a label 424 positioned above and centered between left and right ends of text box 426. Interactive control 432 includes a label 434 positioned above and adjacent to a right end of text box 436. Interactive control 442 includes a label 444 positioned on the right side of text box 446.

The label locations shown in FIG. 4 are not an exhaustive list of possible locations, and it will be recognized that useful descriptive information for a nameless interactive control may lie in other locations. Descriptive information for a nameless interactive control can lie at the top, bottom, left, and right of a nameless control. In one embodiment, for larger interactive controls, the area above the interactive control is divided into two or more sub-parts where the vicinity control can be found (e.g., top left, top center, and top right). Similarly, other sides (e.g., bottom, left, and right) of larger interactive controls are also divided into two or more different sub-parts. For example, a text box that allows a user to enter five lines of text may be divided on the left and right sides into five sub-parts each (i.e., one for each line of text in the text box). The above examples use a text box as a nameless interactive control and a label as a vicinity control. In general, any interactive control can be a nameless control and any interactive control can be used as a vicinity control.

In one embodiment, computing device 10 is configured to identify a vicinity control for multiple types of interactive controls. In one embodiment, for any given interactive control, computing device 10 generates a list of vicinities to search based on the type or kind of the interactive control and the size of the interactive control. In one embodiment, this list will be different for different kinds of interactive controls and different sizes of interactive controls. The generated list according to one embodiment is prioritized based on user interface guidelines, so that the first vicinity in the list is the most likely location to find a vicinity control, and the last vicinity in the list is the least likely location to find a vicinity control. In one embodiment, the generated list of vicinities comprises a list of directions away from the interactive control, and computing device 10 is configured to search for a vicinity control in each of the listed directions, including multiple distances from the interactive control in the listed direction. For example, computing device 10 may look in a first direction from the interactive control within a first vicinity or region, and if a vicinity control is not found, the computing device 10 may look in the first direction within a second vicinity that is farther away from the interactive control than the first vicinity, and so on.

Figure 5:
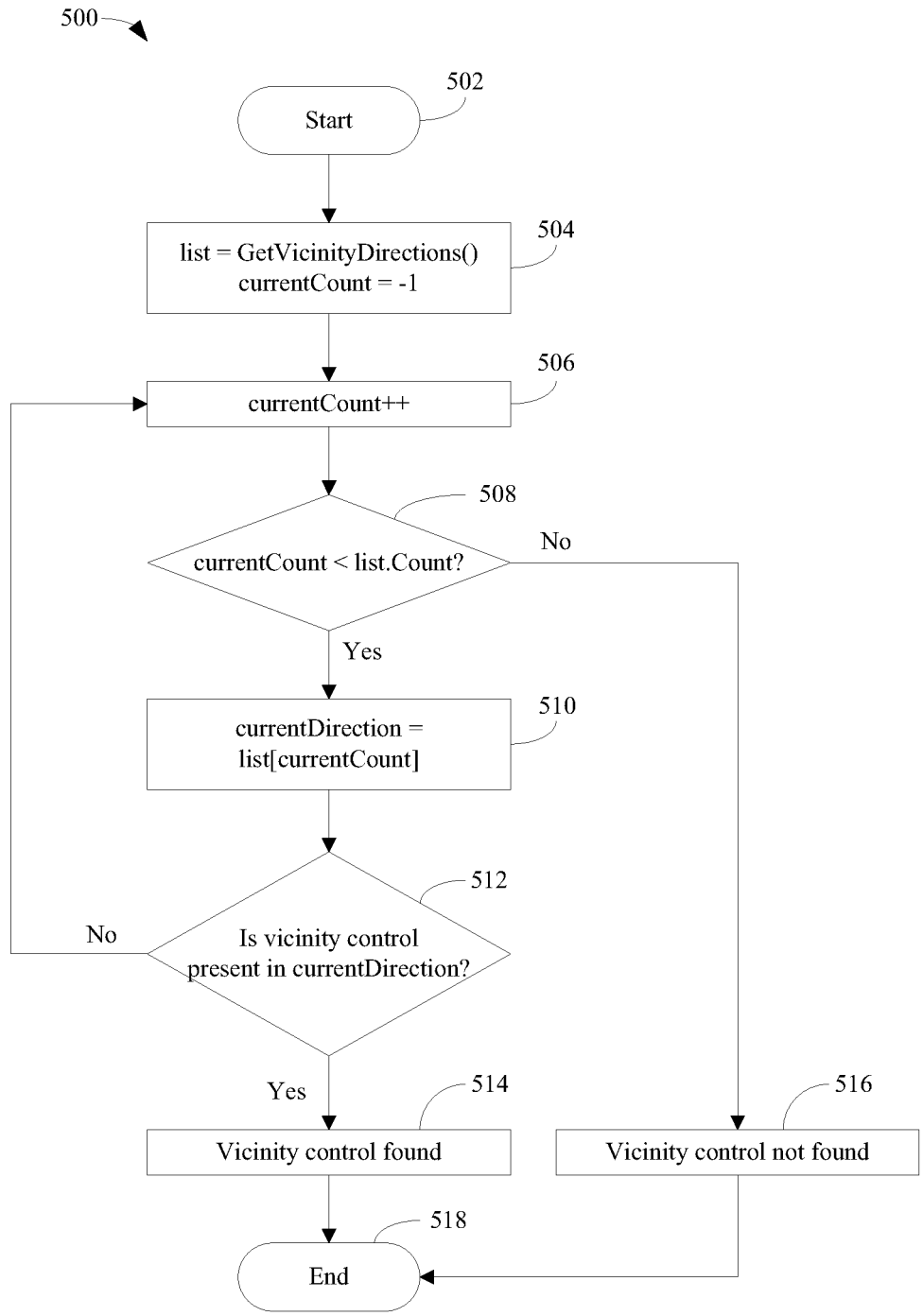
FIG. 5 is a flow diagram illustrating a method of searching for a vicinity control for an interactive control according to one embodiment.

FIG. 5 is a flow diagram illustrating a method 500 of searching for a vicinity control for an interactive control according to one embodiment. In one embodiment, computing device 10 is configured to perform method 500. The method 500 begins at 502, and moves to 504. At 504, a list of vicinity directions is retrieved and stored in a "list" variable, and a currentCount variable is set to an initial value of "−1". At 506, the currentCount variable is incremented. At 508, it is determined whether the currentCount variable is less than a Count value for the "list" variable. The Count value represents the total number of directions provided in the "list" variable. If it is determined at 508 that the currentCount variable is not less than the Count value for the "list" variable (i.e., indicating that all directions in the "list" variable have been searched), the method 500 provides an indication at 516 that a vicinity control has not been found, and the method ends at 518. If it is determined at 508 that the currentCount variable is less than the Count value for the "list" variable (i.e., indicating that all directions in the "list" variable have not yet been searched), the method 500 moves to 510.

At 510, a currentDirection variable is set equal to the current element of the "list" variable (i.e., list[currentCount]). At 512, the direction identified by the currentDirection variable is searched to determine if the vicinity control is present in that direction. If it is determined at 512 that the vicinity control is not present in the direction indicated by the currentDirection variable, the method 500 returns to 506 to increment the currentCount variable and subsequently search in the next direction in the "list" variable for the vicinity control. If it is determined at 512 that the vicinity control is present in the direction indicated by the currentDirection variable, the method 500 provides an indication at 514 that the vicinity control has been found, and returns the identified vicinity control. The method then ends at 518.

Figure 6:
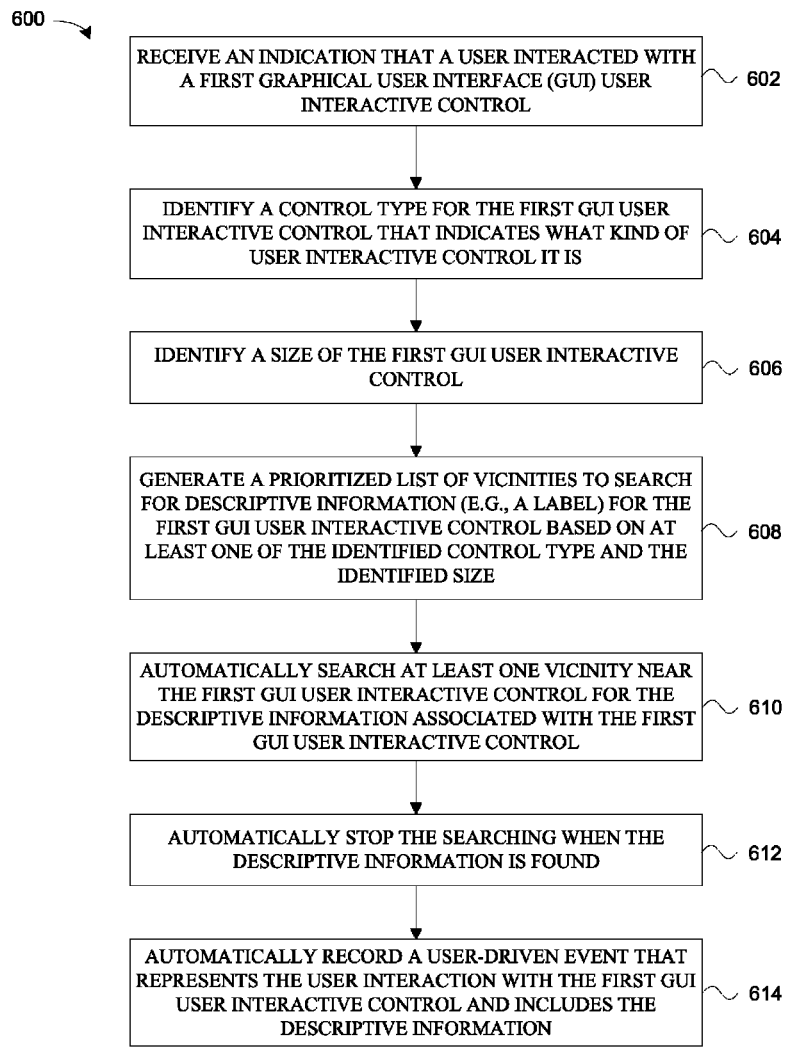
FIG. 6 is a flow diagram illustrating a method of recording user-driven events within a computing system according to one embodiment.

FIG. 6 is a flow diagram illustrating a method 600 of recording user-driven events within a computing system according to one embodiment. In one embodiment, computing device 10 is configured to perform method 600. At 602 in method 600, an indication is received that a user interacted with a first graphical user interface (GUI) user interactive control. At 604, a control type for the first GUI user interactive control is identified that indicates what kind of user interactive control it is. At 606, a size of the first GUI user interactive control is identified. At 608, a prioritized list of vicinities to search for descriptive information (e.g., a label) for the first GUI user interactive control is generated based on at least one of the identified control type and the identified size. At 610, automatic searching at least one vicinity near the first GUI user interactive control is performed for the descriptive information associated with the first GUI user interactive control. At 612, the searching is automatically stopped when the descriptive information is found. At 614, automatic recording of a user-driven event that represents the user interaction with the first GUI user interactive control and includes the descriptive information is performed.

In one embodiment of method 600, the prioritized list includes more vicinities for a larger first GUI user interactive control and less vicinities for a smaller first GUI user interactive control. One embodiment of method 600 further includes generating a list of directions based on information about the first GUI user interactive control, wherein the list of directions identifies a plurality of search directions, and automatically searching in the search directions for the descriptive information. In one form of this embodiment, the list of directions is a prioritized list that is based on an expected location of the descriptive information. Automatically searching in the search directions according to one embodiment includes separately searching multiple vicinities in one of the directions, wherein each one of the multiple vicinities is a different distance away from the first GUI user interactive control.

In one embodiment of method 600, the at least one vicinity comprises a first vicinity above the first GUI user interactive control, a second vicinity below the first GUI user interactive control, a third vicinity left of the first GUI user interactive control, and a fourth vicinity right of the first GUI user interactive control. In another embodiment, the at least one vicinity comprises a plurality of vicinities above the first GUI user interactive control, a plurality of vicinities below the first GUI user interactive control, a plurality of vicinities left of the first GUI user interactive control, and a plurality of vicinities right of the first GUI user interactive control.

In one embodiment of method 600 the descriptive information is implemented as a label adjacent to the first GUI user interactive control. In another embodiment, the descriptive information is contained in an image.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of recording user-driven events within a computing system, comprising:
   receiving, with the computing system, an indication that a user performed a manual user action to interact with a first graphical user interface (GUI) user interactive control displayed on a display of the computing system;
   automatically searching, with the computing system, a plurality of vicinities identified by the computing system that are near the first GUI user interactive control that the user interacted with for descriptive information associated with the first GUI user interactive control; and
   automatically recording, with the computing system, a user-driven event that represents the user interaction with the first GUI user interactive control and includes the descriptive information.

2. The method of claim 1, and further comprising:
   identifying a control type for the first GUI user interactive control that indicates what kind of user interactive control it is; and
   generating a prioritized list of vicinities to search for the descriptive information based on the identified control type.

3. The method of claim 1, and further comprising:
   identifying a size of the first GUI user interactive control; and
   generating a prioritized list of vicinities to search for the descriptive information based on the identified size.

4. The method of claim 3, wherein the prioritized list includes more vicinities for a larger first GUI user interactive control and less vicinities for a smaller first GUI user interactive control.

5. The method of claim 1, and further comprising:
   identifying a control type for the first GUI user interactive control that indicates what kind of user interactive control it is;
   identifying a size of the first GUI user interactive control; and
   generating a prioritized list of vicinities to search for the descriptive information based on the identified control type and the identified size.

6. The method of claim 1, and further comprising:
   generating a list of directions based on information about the first GUI user interactive control, wherein the list of directions identifies a plurality of search directions; and
   automatically searching in the search directions for the descriptive information.

7. The method of claim 6, wherein the list of directions is a prioritized list that is based on an expected location of the descriptive information.

8. The method of claim 6, wherein automatically searching in the search directions includes separately searching multiple vicinities in one of the directions, wherein each one of the multiple vicinities is a different distance away from the first GUI user interactive control.

9. The method of claim 1, wherein the plurality of vicinities comprises a first vicinity above the first GUI user interactive control, a second vicinity below the first GUI user interactive control, a third vicinity left of the first GUI user interactive control, and a fourth vicinity right of the first GUI user interactive control.

10. The method of claim 1, wherein the plurality of vicinities comprises a plurality of vicinities above the first GUI user interactive control, a plurality of vicinities below the first GUI user interactive control, a plurality of vicinities left of the first GUI user interactive control, and a plurality of vicinities right of the first GUI user interactive control.

11. The method of claim 1, and further comprising:
    automatically stopping the searching when the descriptive information is found.

12. The method of claim 1, wherein the descriptive information is implemented as a label adjacent to the first GUI user interactive control.

13. The method of claim 1, wherein the descriptive information is contained in an image.

14. A computer-readable storage medium storing computer-executable instructions that when executed by at least one processor cause the at least one processor to perform a method of recording user-driven events within a computing system, the method comprising:

receiving an indication that a user performed a manual user action to interact with a first graphical user interface (GUI) user interactive control;

automatically searching, based on the received indication, a plurality of vicinities near the first GUI user interactive control that the user interacted with for a label for the first GUI user interactive control; and automatically recording a user-driven event that represents the user interaction with the first GUI user interactive control and includes the label.

15. The computer-readable storage medium of claim 14, wherein the method further comprises:

identifying a control type for the first GUI user interactive control that indicates what kind of user interactive control it is; and generating a prioritized list of vicinities to search for the label based on the identified control type.

16. The computer-readable storage medium of claim 14, wherein the method further comprises:

identifying a size of the first GUI user interactive control; and generating a prioritized list of vicinities to search for the label based on the identified size.

17. The computer-readable storage medium of claim 16, wherein the prioritized list includes more vicinities for a larger first GUI user interactive control and less vicinities for a smaller first GUI user interactive control.

18. The computer-readable storage medium of claim 14, wherein the method further comprises:

identifying a control type for the first GUI user interactive control that indicates what kind of user interactive control it is;

identifying a size of the first GUI user interactive control; and generating a prioritized list of vicinities to search for the label based on the identified control type and the identified size.

19. The computer-readable storage medium of claim 14, wherein the method further comprises:

generating a prioritized list of directions based on information about the first GUI user interactive control, wherein the list of directions identifies a plurality of search directions; and automatically searching in the search directions for the descriptive information.

20. A method of recording user-driven events within a computing system, comprising:

receiving, with the computing system, an indication that a user performed a manual user action to interact with a first graphical user interface (GUI) user interactive control displayed on a display of the computing system;

generating, with the computing system, based on the received indication, a prioritized list of vicinities to search for a label for the first GUI user interactive control that the user interacted with based on at least one of a type of the first GUI user interactive control and a size of the first GUI user interactive control;

automatically searching, with the computing system, the prioritized list of vicinities for the label; and automatically recording, with the computing system, a user-driven event that represents the user interaction with the first GUI user interactive control and includes the label.

\* \* \* \* \*